United States Patent
Kuo

(10) Patent No.: US 9,615,361 B2
(45) Date of Patent: Apr. 4, 2017

(54) METHOD AND APPARATUS FOR IMPROVING PROXIMITY SERVICE DISCOVERY IN A WIRELESS COMMUNICATION SYSTEM

(71) Applicant: INNOVATIVE SONIC CORPORATION, Taipei (TW)

(72) Inventor: Richard Lee-Chee Kuo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 0 days.

(21) Appl. No.: 14/092,660

(22) Filed: Nov. 27, 2013

(65) Prior Publication Data

US 2014/0153538 A1    Jun. 5, 2014

Related U.S. Application Data

(60) Provisional application No. 61/731,712, filed on Nov. 30, 2012.

(51) Int. Cl.
*H04W 72/04*    (2009.01)
*H04W 48/16*    (2009.01)
*H04W 76/02*    (2009.01)
*H04W 4/02*     (2009.01)

(52) U.S. Cl.
CPC ......... *H04W 72/042* (2013.01); *H04W 4/023* (2013.01); *H04W 48/16* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2011/0268101 A1 | 11/2011 | Wang et al. | |
| 2012/0269250 A1 | 10/2012 | Li et al. | |
| 2014/0066058 A1* | 3/2014 | Yu et al. | 455/434 |
| 2015/0131571 A1* | 5/2015 | Fodor | H04W 8/005 370/329 |

* cited by examiner

*Primary Examiner* — Diane Lo
(74) *Attorney, Agent, or Firm* — Blue Capital Law Firm, P.C.

(57) ABSTRACT

Methods and apparatuses are disclosed to allocating and handling peer discovery resources. One method includes a wireless network allocating multiple sets of peer discovery resources, wherein different sets of peer discovery resources are used by user equipments (UEs) to transmit/receive peer discovery signals for different uses. Another method includes UE receiving a configuration of peer discovery resources from a system information message of a cell, wherein the configuration contains multiple sets of peer discovery resources and different sets of peer discovery resources are used by the UE to receive peer discovery signals for different uses. The method further includes the UE determining which set of peer discovery resources to receive peer discovery signals. The method also includes the UE receiving the peer discovery signals at a set of peer discovery resources determined by the UE.

20 Claims, 4 Drawing Sheets

METHOD AND APPARATUS FOR IMPROVING PROXIMITY SERVICE DISCOVERY IN A WIRELESS COMMUNICATION SYSTEM

CROSS-REFERENCE TO RELATED APPLICATIONS

The present Application claims the benefit of U.S. Provisional Patent Application Ser. No. 61/731,712 filed on Nov. 30, 2012, the entire disclosure of which is incorporated herein by reference.

FIELD

This disclosure generally relates to wireless communication networks, and more particularly, to methods and apparatuses for proximity service discovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed to allocating and handling peer discovery resources. One method includes a wireless network allocating multiple sets of peer discovery resources, wherein different sets of peer discovery resources are used by user equipments (UEs) to transmit/receive peer discovery signals for different uses. Another method includes a UE receiving a configuration of peer discovery resources from a system information message of a cell, wherein the configuration contains multiple sets of peer discovery resources and different sets of peer discovery resources are used by the UE to receive peer discovery signals for different uses. The method further includes the UE determining which set of peer discovery resources to receive peer discovery signals. The method also includes the UE receiving the peer discovery signals at a set of peer discovery resources determined by the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-121435, "Study on LTE Device to Device Proximity Discovery", 3GPP TR 22.803 V1.0.0, "Feasibility Study for Proximity Services (ProSe)," and U.S. Provisional Patent Application Ser. No. 61/722,398, filed Nov. 5, 2012 and is entitled "METHOD AND APPARATUS FOR DIRECT DEVICE TO DEVICE COMMUNICATION IN A WIRELESS COMMUNICATION SYSTEM." The standards and documents listed above are hereby expressly incorporated herein.

Figure 1:
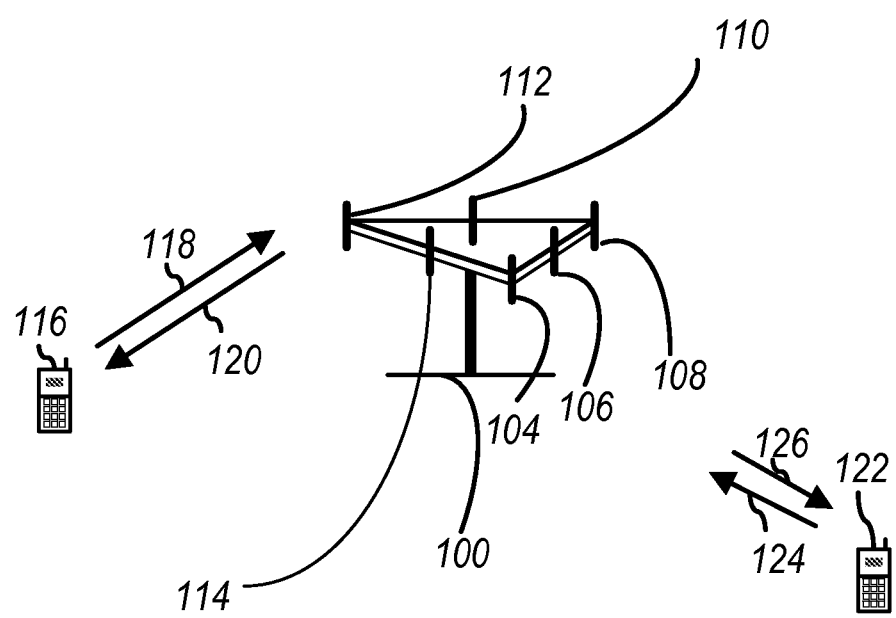
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
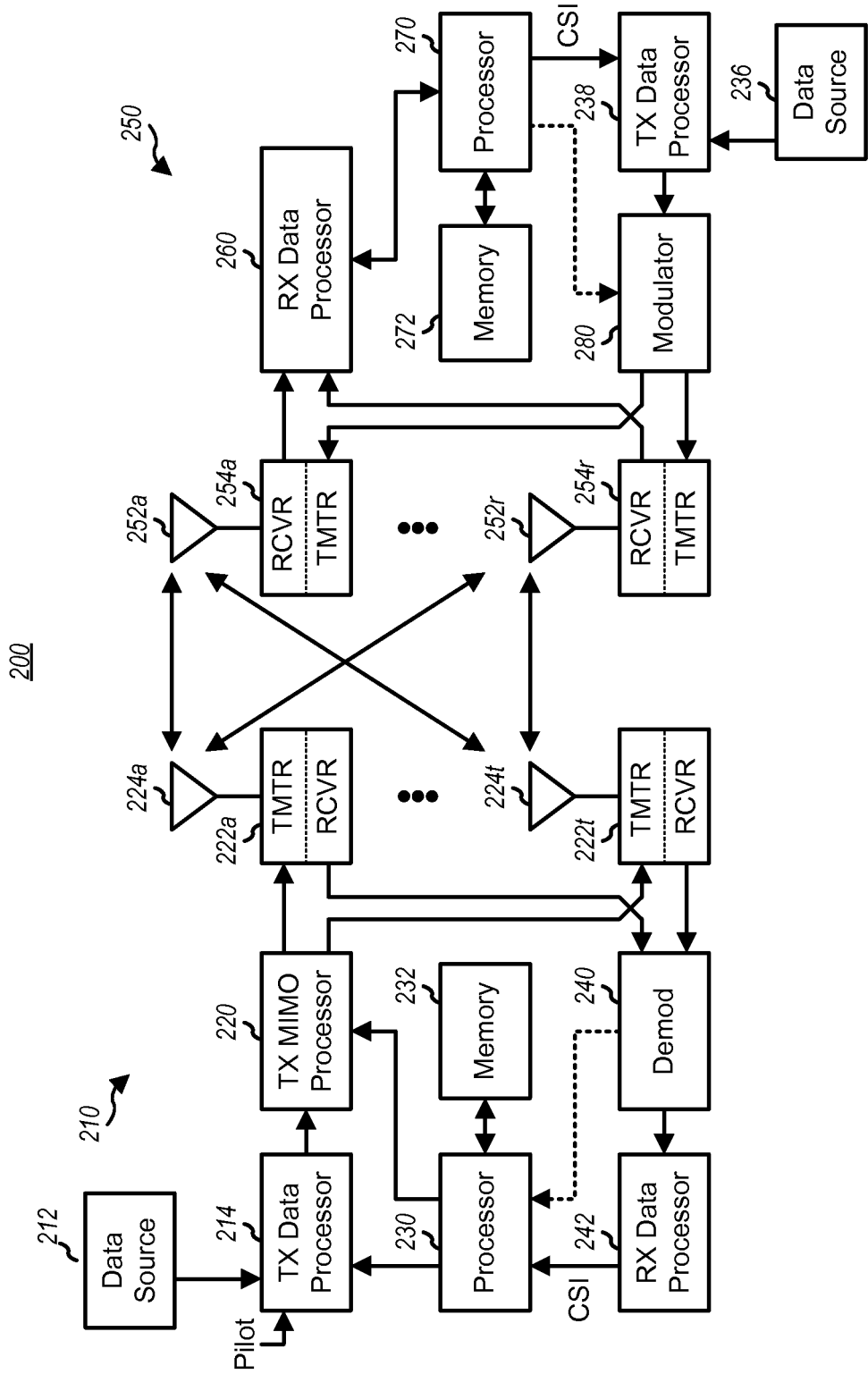
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
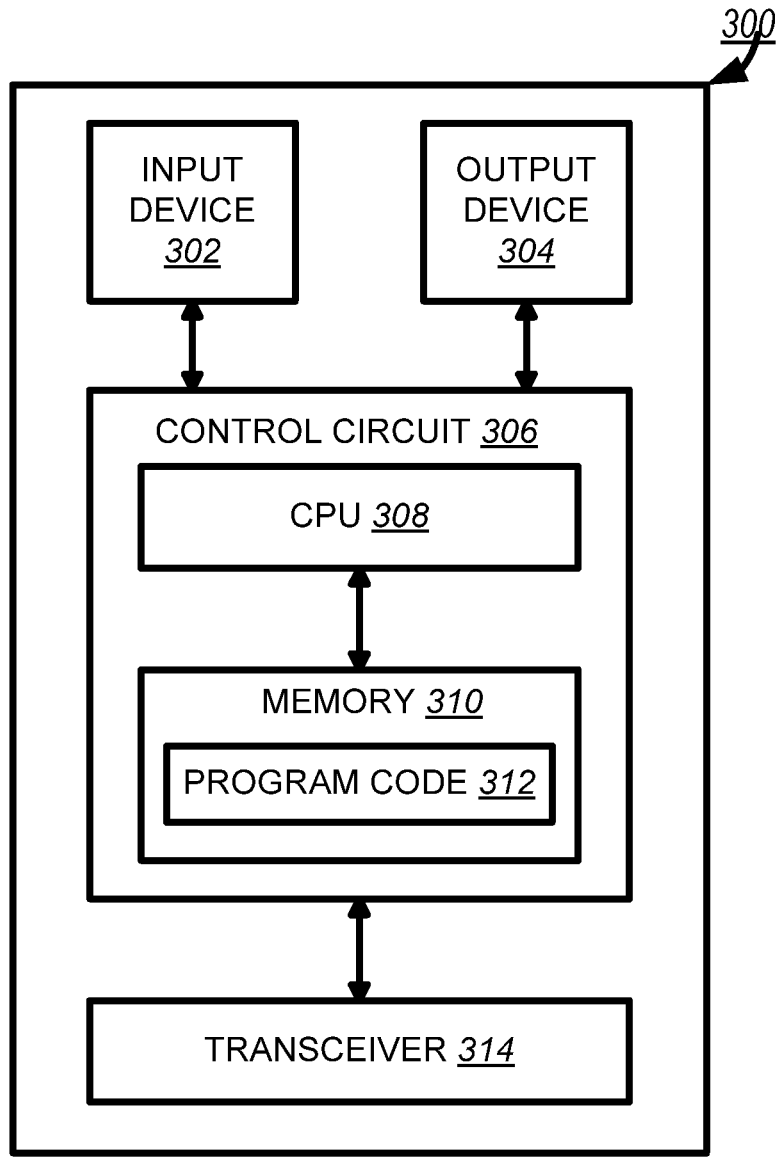
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
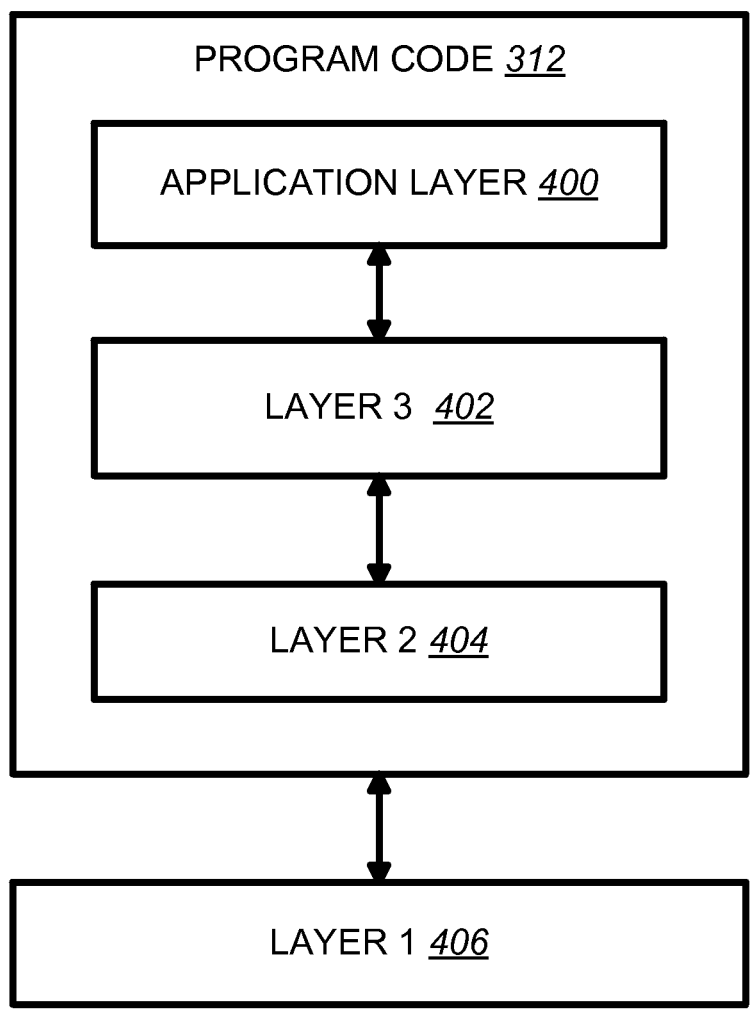
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

Device to device discovery (as discussed in RP-121435) and communication for proximity services is expected to be an important feature for LTE in future, e.g. in Rel-12. The discussion on the feasibility study for Proximity Services (ProSe) is ongoing and is discussed in 3GPP TR 22.803 V1.0.0. The objective of the study is quoted below:

The objective is to study use cases and identify potential requirements for operator network controlled discovery and communications between UEs that are in proximity, under continuous network control, and are under 3GPP network coverage, for:
1. Commercial/social use
2. Network offloading
3. Public Safety
4. Integration of current infrastructure services, to assure the consistency of the user experience including reachability and mobility aspects Additionally, the study item will study use cases and identify potential requirements for
5. Public Safety, in case of absence of EUTRAN coverage (subject to regional regulation and operator policy, and limited to specific public-safety designated frequency bands and terminals)

As discussed in 3GPP TR 22.803 V1.0.0, ProSe includes two main functions: ProSe Discovery and ProSe Communication. ProSe Discovery is a process that identifies that a UE is in proximity of another UE using Evolved Universal Terrestrial Radio Access (E-UTRA). ProSe Discovery shall support a minimum of three range classes—for example short, medium and maximum range. ProSe Communication is a communication between two UEs in proximity by means of a communication path established between the UEs. For example, the communication path could be established directly between the UEs or routed via local eNB(s).

A UE that supports ProSe Discovery and/or ProSe Communication is called a ProSe-enabled UE.

ProSe Discovery may be either Open ProSe Discovery or Restricted ProSe Discovery. Open ProSe Discovery does not need explicit permission from the UE to be discovered. Restricted ProSe Discovery needs explicit permission from the UE to be discovered.

In the wireless communication technology, there are methods for transmission and reception of proximity detection signal for peer discovery. In one method, peer discovery is a UE performs peer discovery with the assistance from the network. The network may send a notification to the UE of a match for the UE seeking a peer. Additionally, the notification may also convey resources and/or other parameters to use for peer discovery. Upon receiving the notification, the UE may then perform peer discovery using proximity detection signals. In one design, the proximity detection signal is based on the PUSCH, which includes a proximity detection reference signal and a data portion. The data portion of the proximity detection signal may include information such as identity of the UE transmitting a proximity detection signal, services requested by the UE, services offered by the UE, and/or location information of the UE.

In the wireless communication technology, methods for indicating wireless network resources for communicating peer discovery signals are known. These methods provide exemplary time structures and channels that may be utilized for peer-to-peer discovery and communication. The time structures may have varying levels of frames of time, in which each lower frame level is further subdivided into different periods of time. Similarly, the channels for peer discovery may be subdivided into subchannels, in which each of the subchannels may be composed of a plurality of blocks/resources for communicating peer discovery information. For example, a peer discovery channel may include subchannels such as a long range peer discovery channel, medium range peer discovery channel, or a short range peer discovery channel.

When a UE is turned on, the UE listens to the peer discovery channel for a period of time and selects a block for transmitting its peer discovery signal. In other blocks, the UE may listen for peer discovery signals sent from other UEs.

In 3GPP TR 22.803-100, service flows of the Open ProSe Discovery Use Case describe that a user may be notified of a store or restaurant by an application when the store or restaurant is discovered nearby. The content in a proximity detection signal may also be known as "expression", which is mapped to 128 bits at the physical layer. It is noted that it requires 7 bits to represent a character with ASCII codes and thus an expression of 128 bits can only contain 18 characters if ASCII codes are used.

In addition to broadcasting its presence, some stores or restaurants may want to provide more information e.g. "Shoes 50% OFF from 2:00~5:00 p.m. at ATT $3^{rd}$ floor", which requires much more than 128 bits. As disclosed in U.S. Provisional Application No. 61/722,398, a proximity detection signal is designed to include a field which indicates that there is more information to be delivered so that a UE receiving the proximity detection signal may initiate a peer to peer connection to receive more information. This method requires redundant resources for delivering the same information to different UEs and thus is not efficient in terms of resource usage.

In one embodiment, more information may be delivered in a peer discovery signal (or a proximity detection signal) by allocating a separate set of peer discovery resources for accommodating larger payload. In one embodiment, a peer discovery for commercial use may carry more information than a peer discovery for social use. In this embodiment, a UE on the transmitting site may choose which kind of peer discovery to transmit and a UE on the receiving site may choose which kind of peer discovery to receive. For example, the UE can choose either a peer discovery for commercial use or a peer discovery for social use, or even both according to certain kind of setting by upper layers. For example, a user or an application may instruct the UE to perform a peer discovery by setting his/her/its interest. As a result, the ability to select different types of peer discovery can save the power of the receiving UE.

In one embodiment, a configuration of the peer discovery resources is broadcast in a system information message of a cell. In another embodiment, two sets of peer discovery resources are used by UEs to transmit peer discovery signals for commercial use and social use. In one embodiment, each peer discovery signal contains an identity of a UE which transmits the peer discovery signal. In yet another embodiment, each peer discovery signal contains a service information indicating a service requested or offered by a UE which transmits the peer discovery signal. In one embodiment, each peer discovery resource is defined by number of subcarriers in a frequency domain and number of orthogonal frequency divisional multiplexing (OFDM) symbols in time domain.

Referring back to FIGS. 3 and 4, the device 300 includes a program code 312 stored in memory 310. In one embodiment, the CPU 308 could execute the program code 312 (i) to receive a configuration of peer discovery resources from a system information message of a cell, wherein the configuration contains multiple sets of peer discovery resources and different sets of peer discovery resources are used by the communication device to receive peer discovery signals for different uses, (ii) to determine which set of peer discovery resources to receive peer discovery signals, and (iii) to receive the peer discovery signals at a set of peer discovery resources determined by the UE.

In another embodiment, the device 300, as shown in FIGS. 3-4, includes a program code 312 stored in memory 310. In one embodiment, the CPU 308 could execute the program code 312 (i) to receive a configuration of peer discovery resources from a system information message of a cell, wherein the configuration contains multiple sets of peer discovery resources and different sets of peer discovery resources are used by the device to transmit peer discovery signals for different uses, (ii) to determine, which set of peer discovery resources to transmit a peer discovery signal, and (iii) to transmit the peer discovery signal at a peer discovery resource in a set of peer discovery resources determined by the device.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for allocating peer discovery resources, the method comprising:
   allocating, by a wireless network, multiple sets of peer discovery resources,
   wherein each set of peer discovery resources includes multiple peer discovery resources, and each peer discovery resource is used for transmitting or receiving a peer discovery signal, and
   wherein different sets of peer discovery resources are used by user equipments (UEs) to transmit or receive peer discovery signals for different uses.

2. The method of claim 1, wherein a configuration of the peer discovery resources is broadcast in a system information message of a cell.

3. The method of claim 1, wherein two sets of peer discovery resources are used by UEs to transmit or receive peer discovery signals for commercial use and social use.

4. The method of claim 1, wherein each peer discovery signal contains an identity of a UE which transmits the peer discovery signal.

5. The method of claim 1, wherein each peer discovery resource is defined by number of subcarriers in a frequency domain and number of orthogonal frequency divisional multiplexing (OFDM) symbols in time domain.

6. A method for handling peer discovery resources, the method comprising:
   receiving, by a user equipment (UE), a configuration of peer discovery resources from a system information message of a cell,
      wherein the configuration contains multiple sets of peer discovery resources, each set of peer discovery resources includes multiple peer discovery resources, and each peer discovery resource is used for transmitting or receiving a peer discovery signal, and
      wherein different sets of peer discovery resources are used by the UE to transmit receive peer discovery signals for different uses;
   determining, by the UE, which set of peer discovery resources to transmit or receive peer discovery signals; and
   transmitting or receiving, by the UE, the peer discovery signals at a set of peer discovery resources determined by the UE.

7. The method of claim 6, wherein the UE determines which set of peer discovery resources to transmit or receive peer discovery signals according to a setting by upper layers.

8. The method of claim 6, wherein two sets of peer discovery resources are used by UEs to transmit or receive peer discovery signals for commercial use and social use.

9. The method of claim 6, wherein the peer discovery signal contains an identity of a UE which transmits the peer discovery signal.

10. The method of claim 6, wherein the peer discovery signal contains a service information indicating a service requested or offered by a UE which transmits the peer discovery signal.

11. A communication device to handle peer discovery resources, the communication device comprising:
   a control circuit;
   a processor installed in the control circuit; and
   a memory installed in the control circuit and operatively coupled to the processor,
   wherein the processor is configured to execute a program code stored in the memory to handle peer discovery resources by:
      receiving a configuration of peer discovery resources from a system information message of a cell,
         wherein the configuration contains multiple sets of peer discovery resources, each set of peer discovery resources includes multiple peer discovery resources, and each peer discovery resource is used for transmitting or receiving a peer discovery signal, and
         wherein different sets of peer discovery resources are used by the communication device to transmit or receive peer discovery signals for different uses;
      determining which set of peer discovery resources to transmit or receive peer discovery signals; and
      transmitting or receiving the peer discovery signals at a set of peer discovery resources determined by the communication device.

12. The communication device of claim 11, wherein the communication device determines which set of peer discovery resources to transmit or receive peer discovery signals according to a setting by upper layers.

13. The communication device of claim 11, wherein two sets of peer discovery resources are used by communication devices to transmit or receive peer discovery signals for commercial use and social use.

14. The communication device of claim 11, wherein the peer discovery signal contains an identity of a communication device which transmits the peer discovery signal.

15. The communication device of claim 11, wherein the peer discovery signal contains a service information indicating a service requested or offered by a communication device which transmits the peer discovery signal.

16. A communication device to allocate peer discovery resources, the communication device comprising:
   a control circuit;
   a processor installed in the control circuit; and
   a memory installed in the control circuit and operatively coupled to the processor,
   wherein the processor is configured to execute a program code stored in the memory to allocate peer discovery resources by:
      allocating, by the communication device, multiple sets of peer discovery resources,
         wherein each set of peer discovery resources includes multiple peer discovery resources and each peer discovery resource is used for transmitting or receiving a peer discovery signal, and
         wherein different sets of peer discovery resources are used by user equipments (UEs) to receive or transmit peer discovery signals for different uses.

17. The communication device of claim 16, wherein a configuration of the peer discovery resources is broadcast in a system information message of a cell.

18. The communication device of claim 16, wherein two sets of peer discovery resources are used by UEs to transmit or receive peer discovery signals for commercial use and social use.

19. The communication device of claim 16, wherein each peer discovery signal contains an identity of a UE which transmits the peer discovery signal.

20. The communication device of claim 16, wherein each peer discovery resource is defined by number of subcarriers in a frequency domain and number of orthogonal frequency divisional multiplexing (OFDM) symbols in time domain.

* * * * *